United States Patent [19]

Cope et al.

[11] Patent Number: 4,886,626
[45] Date of Patent: Dec. 12, 1989

[54] CONDUCTIVE POLYURETHANE FOAM COMPOSITIONS CONTAINING TETRALYANOETHYLENE AND METHOD

[75] Inventors: Richard P. Cope, New City, N.Y.; Leo Fisher, Fairlawn, N.J.

[73] Assignee: Crest-Foam Corporation, Moonachie, N.J.

[21] Appl. No.: 122,371

[22] Filed: Nov. 19, 1987

Related U.S. Application Data

[63] Continuation-in-part of Ser. No. 51,949, May 19, 1987, abandoned.

[51] Int. Cl.[4] .............................. H01R 1/06; C08J 9/00
[52] U.S. Cl. ................................... 252/500; 521/118; 521/125; 521/128; 521/130; 521/164
[58] Field of Search ............... 521/118, 125, 128, 130, 521/164; 252/500, 511

[56] References Cited

U.S. PATENT DOCUMENTS

| | | | |
|---|---|---|---|
| 3,620,986 | 11/1971 | Diehr et al. | 521/118 |
| 3,835,102 | 9/1974 | Shinohara | 528/397 |
| 4,377,646 | 3/1983 | Blount | 521/154 |
| 4,621,106 | 11/1986 | Fracalossi et al. | 252/511 |
| 4,673,720 | 6/1987 | Matsumura et al. | 252/500 |
| 4,703,099 | 10/1987 | Regelman | 521/128 |

FOREIGN PATENT DOCUMENTS

| | | | |
|---|---|---|---|
| 18757 | 1/1982 | Japan | 252/500 |
| 24371 | 5/1982 | Japan | 252/511 |
| 115433 | 7/1982 | Japan | 252/511 |
| 185602 | 11/1982 | Japan | 252/511 |
| 135208 | 8/1984 | Japan | 252/500 |

Primary Examiner—John Kight
Assistant Examiner—Dennis R. Daley
Attorney, Agent, or Firm—Darby & Darby

[57] ABSTRACT

An electrically conductive polyurethane foam product is prepared by the in situ combination of polyurethane-forming reactants and an effective amount of a charge transfer agent selected from the group consisting of tetracyanoethylene (TCNE), picric acid and analogs thereof, for lowering electrical resistance of the foam product to less than $1 \times 10^{12}$ ohms. In a preferred embodiment, the conductive foam product is reticulated to a void volume of more than 80% after completion of the foam forming reaction.

30 Claims, 4 Drawing Sheets

CONDUCTIVE POLYURETHANE FOAM COMPOSITIONS CONTAINING TETRALYANOETHYLENE AND METHOD

This application is a continuation-in-part of U.S. patent application Ser. No. 051,949 filed 5/19/87, now abandoned.

The present invention relates to three-dimensional expanded polyurethane foam materials, such as flexible reticulated polyurethane foam compositions, that are electrically conductive and have antistatic properties. More specifically the invention relates to a polyurethane foam having long-lasting and reliable electrical conductivity characteristics and a volume resistivity of approximately $10^{12}$ ohm cm or less. This foam is produced by combining conventional polyurethane foam-forming reactants and an effective amount of a charge transfer agent such as the electron acceptor compound tetracyanoethylene (TCNE), picric acid and analogs thereof, under foam-forming conditions. In one preferred embodiment, the conductive foam is subsequently reticulated by momentary exposure to high temperature.

The analogs, according to the invention, have the formula $AR\text{-}X^m\text{-}Y^n$, where AR is a radical selected from the group consisting of benzene, toluene and naphthalene; X is selected from the group consisting of OH, $OCH_3$, $CH_2OH$, $NH_2$, $NHCOCH_3$, CN, and O-M, where M is an alkalai metal salt of sodium or potassium; Y is selected from the group consisting of $NO_2$ and $COCH_3$; m is 1 or 2; and n is from 1 to 3.

BACKGROUND OF THE INVENTION

Reticulated polyurethane foam products have been used for many years as explosion suppression materials in the fuel tanks and containers of gasoline and kerosene powered vehicles. The reticulated foam is a three dimensional plastic material consisting of a plurality of strands which are interconnected at spaced apart points to define void spaces or pores. The product generally has a void volume of more than 80% and preferably more than 90%. The reticulated foam material is installed inside the fuel tank to occupy between about 50% and 100% of the interior dimensions of the tank and serves to inhibit the rapid and uncontrolled spread of a flame front when a spark is introduced into the fuel mixture. Thus, polyurethane foams and foam linings are recognized as an important safety feature in combustion technology, especially in the fuel tanks of military and racing vehicles which are often operated under incendiary or static electric discharge conditions. The reticulated urethane foam minimizes the danger of fire or explosion resulting from exposure to static electric discharges which often occur during operation or fueling, or as the result of sparks that may be generated in crashes.

Within a fuel containment area provided with a reticulated polyurethane foam, fuel is often subject to vibration and turbulent motion. The foam tends to suppress fuel agitation due to vehicular motion, but static charges can build up within the tank or containment area until they overcome air resistance, and dangerous static electricity discharges can occur, for example during a refueling operation. A static discharge, for example between an ungrounded fuel hose nozzle and the metal frame of the vehicle or tank, can damage sensitive electrical equipment, or worse, can trigger an explosion within the tank. This problem is recognized in Martel et al., *Static Charge in Aircraft Fuel Tanks*, Technical Report No. AFWAL-TR-80-2049 (September, 1980). Therefore, there is a definite if not urgent need for reliable and long-lasting means for safely controlling static charges in the vicinity of combustion fuels and fuel gases, especially during fueling operations.

The polyurethane foams conventionally used as fuel tank filler materials are non-conductors having high electrical resistivity, e.g., a volume resistivity of greater than $10^{13}$ ohm cm. Therefore, they cannot dissipate or control static charges. Indeed, the high resistivity of conventional foams may contribute to internal explosions caused by static build-up and discharge, even while tending to suppress or contain explosions.

Antistatic polyurethane foams which seek to achieve this purpose are known. Unfortunately, the known compositions and methods suffer from degradation and failure because they rely on antistatic agents that are not permanent; they are too easily removed from the foam structure by washing or by mechanical abrasion, or they degrade rapidly with normal aging and become ineffective as antistatic materials.

One commercially available antistatic flexible foam is produced by incorporating quaternary amines into the foam as an additive, by swelling the finished foam, as described for example in Volz, U.S. Pat. No. 4,578,406; or by using post foaming topical coatings such as conductive carbon-containing surface coatings, described as prior art in the Volz disclosure. Both of these known compositions and methods have certain drawbacks, such as poor resistance to extraction by washing and lack of resistance to mechanical abrasion. Moreover, these prior art foam compositions require a post-foaming treatment in order to impart good electrical conductivity to the foam, i.e. a relatively low electrical resistivity on the order of $10^{12}$ ohm cm or less. Additionally, some of the known antistatic foams can be very sensitive to humidity.

Fuji et al., U.S. Pat. No. 3,933,697 discloses an antistatic polyurethane foam containing a quaternary ammonium salt as the antistatic agent. Although the Fuji patent indicates that the quaternary additive can be incorporated into the foam forming reactants, it has been found that foams which depend upon quaternary salts for their electrical conductivity properties do not retain such properties when the foam is exposed to aqueous or solvent solutions for extended periods of time. Indeed, the known quaternary salts are water soluble, and wash too readily from the foam.

Berbeco, U.S. Pat. No. 4,301,040 discloses a conductive polyurethane foam incorporating finely divided conductive particles. However, it has been found that the addition of an effective antistatic amount of finely divided conductive particles results in severe deterioration of the physical properties of the foam material. Foams of sufficiently low resistivity to provide satisfactory electrical conductivity or antistatic properties (less than $10^{12}$ ohm cm) are difficult to obtain using known procedures and tend to lose their antistatic electrical properties upon exposure to high humidity or solvents.

Other conductive compounds are known to be useful in combination with solid polymers, including polyurethane resins, as opposed to polyurethane foams. For example, British Pat. No. 1,158,384; and (R. Knoesel et. al.) Bul. Soc. Chim. Fr. 1969 (1) 294–301, disclose the use of ethenetetracarboxy nitrile, also known as tetracyanoethylene (TCNE) to increase the conductivity of special donor polymer resins such as polydimethylaminostyrene and polyvinylphenothiazine.

German Offenlegungsschrift 28 38 720 discloses selectively conductive solid epoxide or polyurethane casting resins containing TCNE. This reference teaches that TCNE can effect the electrical conductivity of solid synthetic resins as electron acceptors. Solid epoxy or polyurethane resins can be combined with TCNE, and the TCNE polyurethane resin compositions are shown to have an electrical conductivity of about $0.38 \times 10^{-10}$ (ohm cm)$^{-1}$, which corresponds to a resistivity of $2.6 \times 10^{10}$ ohm cm.

These patents do not disclose or suggest that TCNE or picric acid can be combined in situ with foam-forming ingredients as charge transfer agents, to form a conductive polyurethane foam product, nor is there any suggestion that such a foam product could retain its electrical conductivity properties during the exothermic foam forming reaction (in which reaction temperatures may reach 300° F. or higher for several hours) or the subsequent thermal reticulation treatment in which the solidified foam mass is exposed to momentary plasma level temperatures exceeding 2000° C. and the internal temperature of the foam material may reach 400° F. or more.

While the use of conductivity enhancing electron acceptor compounds (charge transfer agents) such as TCNE in solid polyurethane resins is known, the permanent and in situ incorporation of TCNE or picric acid with polyurethane foam reactants to form a permanent electrically conductive polyurethane foam having a resistivity of less than about $10^{12}$ ohm cm is not disclosed or suggested by the prior art.

SUMMARY OF THE INVENTION

It is an object of the invention to provide an electrically conductive polyurethane foam that is suitable for use as a filler material in fuel containers or tanks, particularly in vehicles having combustion powered engines.

It is another object of the invention to provide a method for the in situ preparation of an electrically conductive polyurethane foam.

It is yet another object of the invention to provide a stable, reliable and long-lasting electrically conductive reticulated polyurethane foam structure that retains its conductivity characteristics despite repeated mechanical abrasion and exposure to heat, organic, and aqueous fluids.

A further object of the present invention is to provide an electrically conductive reticulated polyurethane foam having void volume greater than at least about 80%, and preferably more than 90%, using relatively small quantities of the agent conferring electrical conductivity in the foam forming reaction mixture.

Another object of the invention is an electrically conductive thermally reticulated polyurethane foam prepared from a polyol and an isocyanate and containing about 0.02 to 2.5 parts of TCNE per hundred parts by weight of polyol (php) in the foam forming mixture.

Another object of the invention is an electrically conductive thermally reticulated polyurethane foam prepared from a polyol and an isocyanate and containing about 0.02 to 2.5 parts of picric acid per hundred parts by weight of polyol (php) in the foam forming mixture.

It is another object of the invention to provide a polyurethane foam composition having a non-degrading electrical volume resistance of less than about $10^{12}$ ohm cm and preferably less than $10^{11}$ ohm cm.

These and other objects of the invention will be apparent to skilled practitioners in the art from the following disclosure.

The objects of the invention are achieved by providing an electrically conductive polyurethane foam, wherein the electrical resistivity of the foam is desirably decreased to approximately $10^{12}$ ohm cm or less by the integral incorporation of relatively small yet effective quantities of a charge transfer agent selected from the group consisting of TCNE, picric acid and analogs thereof, into the structure of the foam during foam formation.

Advantageous polyurethane foam forming reactants include well-known polyester and polyether polyols and diisocyanate compounds. Additional reaction materials include water, catalyst compounds, and cell control agents. According to the invention, the effective amount of charge transfer agent (e.g., TCNE or picric acid) ranges from about 0.02 to 2.5 parts per hundred parts polyol (php), preferably 0.1 to 0.5 php. Conductivity may be further enhanced by the incorporation of carbon black pigment into the foam forming reaction mixture, when TCNE is the charge transfer agent.

Surprisingly, the electrical conductivity properties afforded by in situ incorporation of TCNE or picric acid survive the exotherm (on the order of about 300° F.) accompanying polyurethane foam formation, subsequent reticulation of the foam under plasma temperature conditions (of about 2000° C. or more), mechanical abrasion and long-term exposure to aqueous and organic fluids. Accordingly, the foam products of the invention are particularly well suited for use as an antistatic material, for example as a filler in aircraft fuel tanks or as a packaging material for delicate electronic components.

According to the invention, a conductive polyurethane foam is foamed in situ, by known means, using conventional foam forming reactants comprising one or more polyols, an isocyanate compound or composition, and an effective amount of a charge transfer agent selected from the group consisting of TCNE, picric acid and analogs thereof, for providing said polyurethane foam with an electrical resistance of less than $1 \times 10^{12}$ ohm cm in a suitable solvent. The optional presence of finely divided carbon black pigment has been found to further enhance the electrical conductivity of polyurethane foam made in accordance with the present invention. The polyurethane foam materials of this invention contain about 0.02 to 2.5 php of charge transfer agent (e.g., TCNE), 2.5 php being about the highest effective amount which can be incorporated into the foam reactants without adversely affecting the physical properties of the foam material unrelated to its electrical conductivity, such as density and firmness. Preferably, the foam forming reactants contain from 0.1 to 0.5 php of charge transfer agent, 0–2.2 php of carbon and preferably 0.7–1.5 php of carbon may be optionally incorporated in the foam. The optional carbon material is preferably added to the polyurethane foam forming reactants in the form of a dispersion of finely divided carbon in the polyol or a low viscosity resin e.g., propoxylated ethoxylated glycerin or polydiethylene adipate.

According to the present invention a polyether or polyester urethane foam is formed from isocyanate and hydroxyl containing (polyol) reactants by known means, but with the charge transfer agent incorporated into the reaction mixture prior to foam formation. The resulting polyurethane foam may thereafter be reticulated to a void volume of greater than 80% and preferably more than 90% if desired, preferably for example according to the thermal reticulation method taught in Geen et al., U.S. Pat. No. 3,175,025 which is incorporated herein by reference. In preparing electrically conductive polyurethane foams for use as fuel tank filler materials, graft polyols are preferred as the polyol constituents of the foam. One preferred graft copolymer is an ethylene oxide propylene oxide ether of glycerin to which a copolymer of styrene and acrylonitrile has been grafted. The invention is not limited, however, to use of these graft materials as the polyol constituent. The flexible three dimensional polyurethane foams of the invention may be prepared by reacting isocyanate compounds with polyether polyols, polyester polyols, mixtures of polyether and polyester polyols, or with mixtures of polyether polyols and copolymer polyols such as for example the grafted polyether containing styrene and acrylonitrile as described above, in the presence of the charge transfer agent (TCNE, picric acid, etc.). The resulting electrically conductive polyurethane foams exhibit a resistivity of less than $10^{12}$ ohm cm, and retain this advantageously decreased electrical resistivity despite exposure to exothermic foam forming conditions, relatively violent high temperature reticulation procedures, immersion in water or fuel, and dry heat aging.

The charge transfer agent that is incorporated into the foam in situ, according to the invention, is at least one of TCNE, picric acid, and a compound of the formula $$AR\text{-}X^m\text{-}Y^n,$$

where

AR is a radical selected from the group consisting of benzene, toluene and naphthalene;

X is selected from the group consisting of OH, OCH$_3$, CH$_2$OH, NH$_2$, NHCOCH$_3$, CN, and O-M, where M is an alkalai metal salt of sodium or potassium;

Y is selected from the group consisting of NO$_2$ and COCH$_3$;

m is an integer of 1 or 2; and n is an integer from 1 to 3.

DETAILED DESCRIPTION OF THE INVENTION

Figure 1:
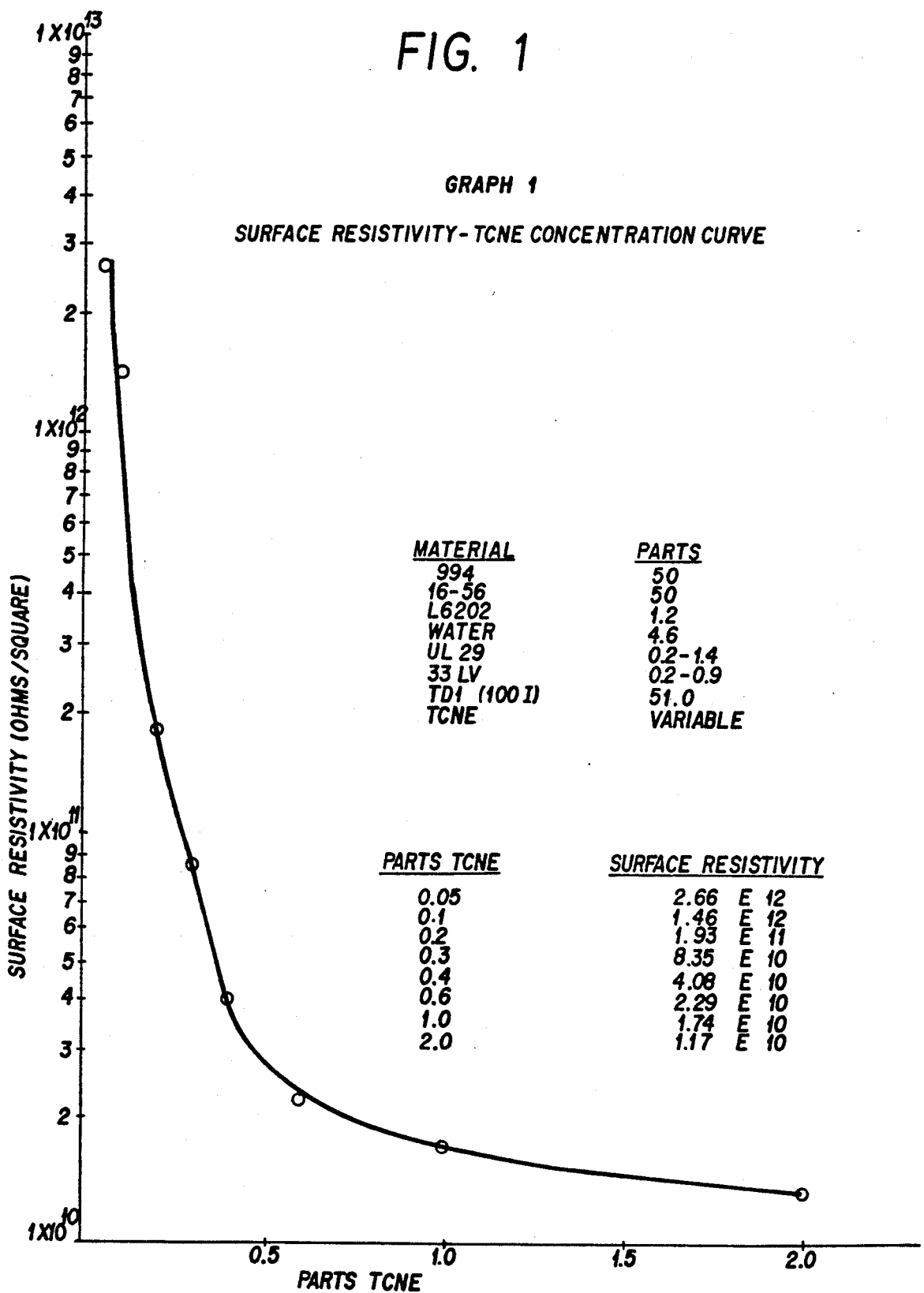
FIG. 1 is a graph showing the surface resistivity of TCNE foam as a function of in situ TCNE concentration.

The invention is described with reference to a number of examples and embodiments, and with reference to a number of comparative tests. It will be understood by skilled practitioners that these examples, embodiments and comparisons are illustrative only, and do not limit the scope of the invention.

The polyurethane foams of the present invention may be prepared using the one shot or the pre-polymer methods that are well known to the art and in which hydroxyl containing ingredients (polyols) and polyisocyanates are combined in the presence of well known catalysts, blowing agents, foam stabilizers, flame retardants, pigments and extenders. Polyester based polyurethanes, polyether based polyurethanes, copolymer polyol based polyurethanes and mixtures of them may be used in making the conductive foams of the invention, although polyether foams are preferred.

The polyisocyanate ingredients that are useful in the present invention include, but are not limited to, toluene diisocyanate (TDI), which is preferred, and polymers of diphenylmethane 4,4' diisocyanate (MDI).

Representative hydroxyl containing ingredients for use in the invention include polyester and polyether polyols such as, for example, the polypropylene glycol adipate glycerine ester and the ethylene oxide propylene oxide ether of glycerin. Graft copolymers of hydroxyl containing constituents which may also be employed as polyol constituents in practicing the invention include ethylene oxide propylene oxide ether of glycerin to which various amounts (between 20 and 40%) of a copolymer of styrene and acrylonitrile have been grafted. The preferred graft polyol for use in the present invention is a polymer consisting of the ethylene oxide propylene oxide ether of glycerin to which 20% of a copolymer of styrene and acrylonitrile has been grafted.

It has been surprisingly found that better electrical conductivity properties are obtained using non-grafted polyols, when TCNE is the charge transfer agent. Thus, the electrical conductivity of urethane foams made using an ethylene oxide propylene oxide ether of glycerin as the hydroxy containing constituent yields foams having an electrical resistivity of $2 \times 10^{10}$ ohm cm, (e.g., using 0.2 php TCNE) while foams prepared with a ethylene oxide propylene oxide ether of glycerin copolymerized with 40% of a styrene and acrylonitrile copolymer have an electrical resistance of $3 \times 10^{11}$ ohm cm.

According to the invention, polyether or polyester polyols are reacted in situ under the usual polyurethane foam forming conditions with an isocyanate and from 0.02 to 2.5 php (preferably 0.1 to 0.5 php) of a charge transfer agent selected from the group consisting of TCNE, picric acid and analogs thereof. The foam forming reaction is conducted in the presence of the usual foam forming ingredients including catalyst compounds (such as tertiary amines and organo tin compounds) cell control agents and water to provide a polyurethane foam having an electrical resistivity of about $10^{12}$ ohm cm or less. The electrically conductive polyurethane foam product may be advantageously reticulated, so that the foam product has a void volume of at least 80% and preferably more than 90%, with the thermal reticulation technique taught in Geen U.S. Pat. No. 3,750,025. In this procedure the three dimensional foam product is placed in a sealed gas-filled chamber filled with a combustible gas and the gas ignited to produce an explosion and a flame front in which the foam is exposed to momentary plasma temperatures in excess of 2000° C.

It has been found that polyurethane foams made with in situ charge transfer agents are stable and retain their enhanced electrical conductivity properties after exposure to elevated temperatures (284° F. for 28 days) and long term immersion in aqueous and organic liquids at temperatures up to 200° C.

The invention will be illustrated in the following tables and working examples. With reference to the tables, foam formulations are based on 100 parts by weight of polyol, as is customary. All other components are added in parts by weight per hundred parts by weight of polyol (php), unless otherwise noted. "E n" is a convenient shorthand notation for the expression: "x $10^n$." Following is an identification of some of the materials used in the working examples.

CEF is Tris chlorethyl phosphate (available from Stauffer Chemicals as Fyrol CEF)

DPG is Dipropylene glycol

PCF is Tris chloroisopropyl phosphate available from Stauffer Chemical Corp.

TDI 80/20 is an 80%/20% mixture of 2,4-diisocyanatomethylbenzene and 2,6-diisocyanatomethylbenzene commonly called toluene diisocyanate (or 80/20 TDI).

TDI 70/30 is a 70%/30% mixture of 2,4-diisocyanatomethylbenzene and 2,6-diisocyanatomethylbenzene commonly called toluene diisocyanate (or 70/30 TDI).

EXAMPLE 1

Manufacture of Electrically Conductive TCNE Foams

A wide variety of polyurethane foam compositions containing TCNE as the charge transfer agent can be prepared, as illustrated below.

Formula 1(A)

A polyurethane antistatic foam was prepared by admixing the following ingredients on a conventional polyurethane foaming machine:

| Material | Parts |
| --- | --- |
| Pluracol 718 - a standard 3000 molecular weight ethoxylated propoxylated glycerin polyol manufactured by BASF. | 100 |
| Goldschmidt Silicone 8028 is a silicone surfactant manufactured by Goldschmidt Corp., Hopewell, Virginia | 1.0 |
| Water | 4.1 |
| Union Carbide Amine Catalyst A-1 | 2.1 |
| M & T Tin Catalyst T-125 - a dibutyl tin dialkyl acid manufactured by M & T Chemicals, Inc., Rahway, New Jersey | 1.4 |
| Carbon Pigment - an 18% dispersion of carbon in polyether polyol. (Dispersion 4824 manufactured by Pigment Dispersions Inc., Edison, N.J.) | 7.7 |
| 5% solution of TCNE in CEF | 40.0 |
| TDI 80/20 | 40.4 |

The resulting foam product was not reticulated after foam formation, but had a surface resistivity of 3.1 E 9 ohms/square and a volume resistivity of 2.2 E 9 ohm cm.

Formula 1(B)

A graft antistatic foam was prepared using the following formulation.

| Material | Parts |
| --- | --- |
| Pluracol 994 is a graft polyol, (40% acrylonitrile styrene copolymer) grafted on a ethoxylated propoxylated glycerine (M W 5600) manufactured by BASF. | 100 |
| Union Carbide Silicone L6202 is a silicone surfactant manufactured by Union Carbide. | 1.2 |
| Water | 4.6 |
| Witco Tin Catalyst UL29 - is Diethyl tin mercaptide | 0.3 |
| manufactured by Witco Chemical Corp., Chicago, Ill. | |
| Dabco 33LV - a 33% solution of triethylene diamine in dipropylene glycol, manufactured by Air Products & Chemicals, Inc., Allentown, Pennsylvania | 0.4 |
| 5% solution of TCNE in PCF | 4.0 |
| TDI 80/20 | 51.0 |

The non-reticulated foam had a resistivity of 3.2 E 11 ohm cm.

Formula 1(C)

A polyester antistatic foam was prepared using the following formulation:

| Material | Parts |
| --- | --- |
| F-76 Resin - a hydroxyl terminated ester resin - specifically glycerin adipate polyoxyethylene, manufactured by Witco Chemical Corp. | 100 |
| TDI 70/30 | 47.3 |
| L536 - a silicone surfactant manufactured by Union Carbide. | 1.2 |
| Water | 3.7 |
| N—Cocomorpholine | 1.6 |
| Amine Catalyst - Thancat M-75 a proprietary tertiary amine, manufactured by Texaco Chemical Co., Bellaire, Texas | 1.2 |
| Amine Catalyst ADMA-6 - hexadecyl dimethyl amine, manufactured by Ethyl Corp., Houston, Texas | 0.5 |
| 5% solution of TCNE in PCF | 6.0 |

This foam had a surface resistivity of 3.6 E 11 ohms/square and a volume resistivity of 2.8 E 10 ohm cm. Moreover, when tested at 15% relative humidity the foam had a static decay time (5000–50 volts) of 0.7 seconds indicating that the foam rapidly dissipates a static electric charge.

Formula 1(D)

A polyurethane antistatic foam was prepared using the following formulation:

| Material | Parts |
| --- | --- |
| Niax 16-56 Polyol - a 3000 molecular weight propoxylated ethoxylated glycerin polyol manufactured by Union Carbide. | 100 |
| TDI 80/20 | 50.7 |
| L6202 - a silicone surfactant manufactured by Union Carbide. | 1.2 |
| T-120 - dibutyl tin mercaptide, manufactured by M & T Chemical. | 0.5 |
| Water | 4.1 |
| Polycat 12 Amine Catalyst - a proprietary tertiary amine manufactured by Air Products and Chemicals. | 0.8 |
| 5% solution of TCNE in PCF | 0.4 |
| Carbon Pigment - a 18% dispersion of carbon in a polyether polyol. | 7.7 |

This foam had a volume resistivity of 4.7 E 11 ohm cm indicating the effectiveness of in situ TCNE in conferring electrical conductivity properties to polyurethane foam at low concentrations.

Formula 1(E)

An antistatic 15 ppi polyurethane foam was prepared using a graft polyol (as the hydroxyl bearing constituent) on a commercial foaming machine using the following formulation:

| Material | Parts |
| --- | --- |
| Pluracol 637 - a graft polyol 20% acrylonitrile styrene copolymer grafted on a propoxylated ethoxylated glycerin (M W 4200), manufactured by BASF. | 100 |
| TDI 80/20 at 70 °F. | 51.8 |
| L6202 - a silicone surfactant manufactured by Union Carbide. | 1.0 |
| Water | 4.6 |
| C-6N - a 33% solution of stannous octoate in diisononyl phthalate, manufactured by Witco Chemical Corp. | 0.07 |
| Amine Catalyst 33LV | 0.59 |
| 5% solution of TCNE in PCF | 6.0 |
| Carbon Pigment - 18% dispersion of carbon in a polyether polyol. | 4.0 |

The polyol throughput of the foaming machine was 200 lbs/min and the mixing head speed was 6000 RPM producing an antistatic graft foam bun 22½" high and 51" wide. The foam bun was cut into ten foot sections. One ten foot long section of this foam bun was thermally reticulated using the method and apparatus described in Geen U.S. Pat. No. 3,175,025. After thermal reticulation, the foam had a volume resistivity of 3.8 E 10 ohm cm, a surface resistivity of 3.6 E 10 ohms/square and static decay (5000–500 volts) times at 15% relative humidity of 0.07 seconds and (5000–50 volts) 0.15 seconds demonstrating the excellent antistatic properties of the foam.

Formula 1(F)

A polyurethane foam was prepared by reacting the following ingredients in a conventional polyurethane foaming process:

| Material | Parts |
| --- | --- |
| Poly G 32-52 a propoxylated ethoxylated glycerin (M W 3300) manufactured by Olin Chemicals, Stamford, Connecticut. | 100 |
| L-520 - a silicone surfactant manufactured by Union Carbide. | 1.0 |
| Water | 3.5 |
| Niax A-1 - dimethyl aminoethyl ether 70% in dipropylene glycol manufactured by Union Carbide. | 0.4 |
| TBTO - tributyl tin oxide manufactured by M & T. | 0.4 |
| 10% solution of TCNE in DPG | 3.0 |
| Lupranate M-10 - a polymeric diphenylmethane diisocyanate, manufactured by BASF. | 73.3 |

After the foam had cooled the volume resistance of the three dimensional foam structure was measured. This foam had a volume resistance of $1.5 \times 10^{10}$ ohm cm, displaying excellent antistatic properties.

Formula 1(G)

A polyurethane foam was prepared by combining the following reactants:

| Material | Parts |
| --- | --- |
| Niax E-576 Polyol - an ethoxylated propoxylated glycerin (M W 3700), available from Union Carbide. | 100 |
| L-564 - a silicone surfactant available from Union Carbide. | 1.0 |
| Water | 4.1 |
| T-120 - dibutyl tin mercaptide, manufactured by M & T Chemicals. | 0.4 |
| Niax A-4 - a tertiary amine mixture manufactured by Union Carbide. | 1.3 |
| 5% solution of TCNE in PCF | 6.0 |

| Material | Parts |
| --- | --- |
| Isophorone diisocyanate | 60.0 |

This non-reticulated foam had a volume resistivity of $8.2 \times 10^9$ ohm cm.

EXAMPLE 2

Non-Reticulated TCNE Foams

A. Preparation

A series of TCNE non-reticulated polyurethane foams were prepared incorporating 0.05, 0.1, 0.2, 0.3, 0.4, 0.6, 1.0 and 2.0 parts of TCNE. The formulations shown in Table II were used in preparing these non-reticulated TCNE foams. The appropriate quantity of TCNE was first dissolved in Tris chloroisopropyl phosphate to make a 5% TCNE solution and then combined with the other foam forming reactants just prior to foaming. It was found that increasing amounts of TCNE caused increased conductivity (i.e. decreased electrical resistance) as shown in FIGS. 1 and 2.

TABLE I

| FOAM FORMULATIONS | |
| --- | --- |
| Material | Parts |
| 994 | 50 |
| 16-56 | 50 |
| L6202 | 1.2 |
| Water | 4.6 |
| 33LV | 0.4 |
| UL29 | 0.3 |
| TDI (80/20) | 51.0 |
| TCNE | (0.05), (0.1), (0.2), (0.3), (0.4), (0.6), (1.0), and (2.0) |

Figure 2:
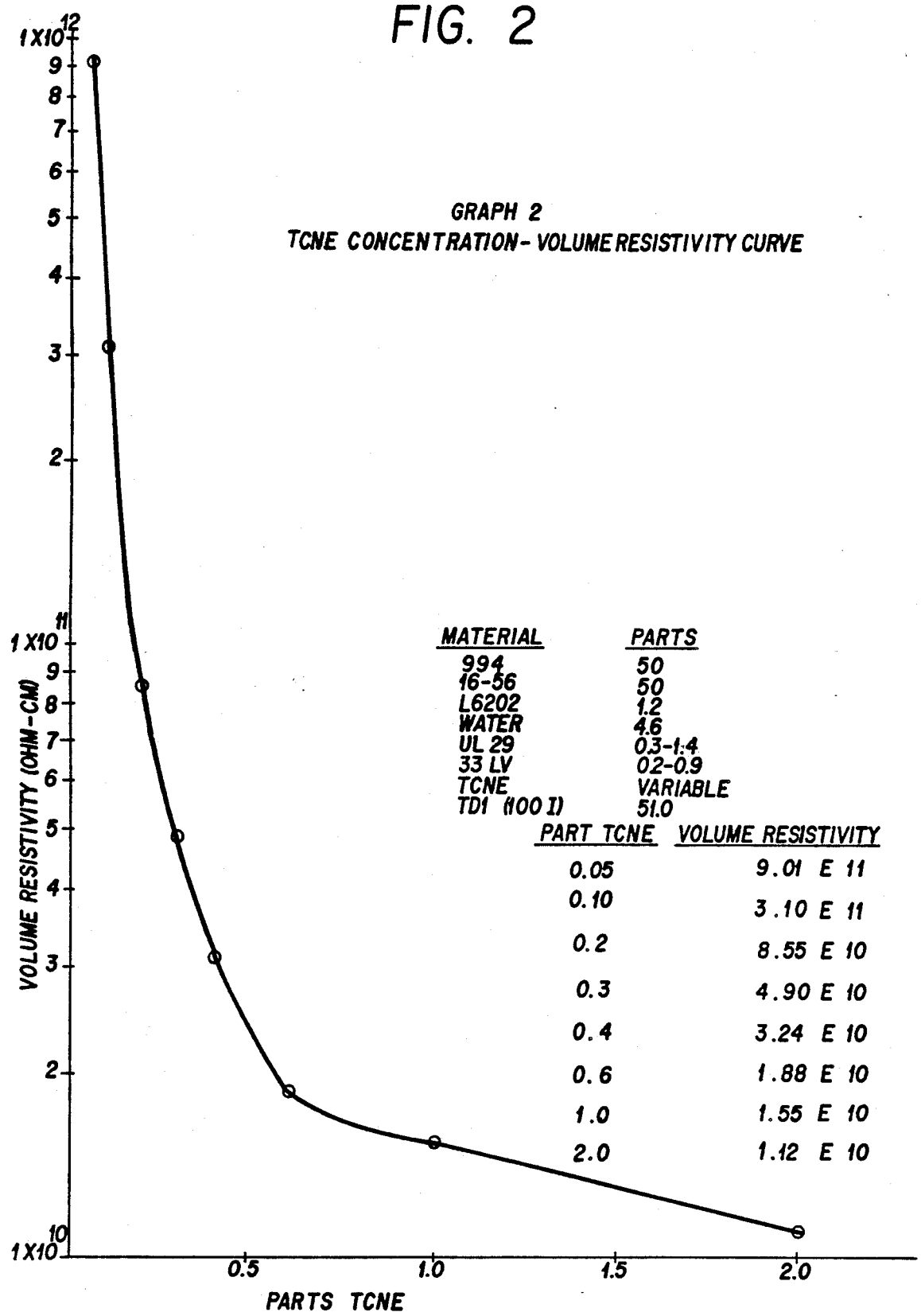
FIG. 2 is a graph showing the volume resistivity of TCNE foam as a function of in situ TCNE concentration.

The surface and volume resistivities of the TCNE containing polyurethane foams made pursuant to Table I were determined and the TCNE concentration was graphed against the respective electrical resistance values, as in FIGS. 1 and 2.

B. Resistivity

After completion of the foaming reaction and cooling of the product to ambient temperatures the volume resistivity of the resulting non-reticulated foam product was measured using the following equipment and procedures (which are essentially those of ASTM-D-257-78). A circular guard ring electrode having a center electrode ring (53 mm in diameter) and an outer electrode ring (101 mm in diameter) is placed in contact with a foam specimen. A base electrode (or flat steel plate) is placed on the opposite side of the foam specimen. The inner (+) electrode and the base (−) electrode are connected to a "Dr. Kamphausen Milli To" ohmmeter (Monroe Electronics, Londonville, New York) to produce a vertical field through the foam specimen between the plates. The guard electrode is connected to the ground. A TCNE foam specimen (approximately 5"×5"×1" thick) is placed between the electrodes, the Milli To voltage set to 500 volts and the variable resistance adjusted until a resistance reading is obtained on the meter. After allowing the meter to stabilize for about 1 minute, the resistance of the specimen, the temperature/humidity and the thickness of the specimen are recorded. The volume resistivity is calculated using the following formula $$\text{Volume Resistivity} = \frac{\text{Measured resistance (ohm)} \times 34.11 \text{ (cm}^2)}{\text{sample thickness (inches)} \times 2.54 \text{ cm/inch}}$$

The surface resistance of a foam specimen is measured using the same apparatus, but with the inner electrode being the anode (+) of the outer electrode being the cathode (−) and the base plate serving as ground. The surface resistivity is the measured resistance ×10. These tests are conducted according to ASTM D257, a standard for surface resistivity measurement.

There are at least three standards for antistatic compounds. Electronics industry standard IS-5 requires a static decay rate of a 99% charge decay in less than two seconds and a surface resistivity of less than $1 \times 10^{13}$ ohms. Military standard MIL-B-81705B is a military specification for packaging materials for electrosensitive devices and explosives. It specifies that the charge induced by the application of 5000 volts at less than 15% relative humidity must decay completely within 2 seconds. This standard does not have any surface resistivity requirement. The National Fire Protection Association standard NFPA-56A-1978 for operating room products requires that an applied charge drop to 10% of its initial value within 0.5 seconds, at a relative humidity of 50%.

Static decay is measured according to Federal Test Method Standard 101B Method 4046. A 5000 volt charge is applied to the surface of the specimen, the maximum charge accepted is measured, and the time required to dissipate the charge after a ground is applied is determined.

These procedures and apparatus were used for the measurements reported in the Examples.

In this present example, TCNE was found to be a particularly effective antistatic agent for graft foam (i.e. foam produced used graft polyols). Use of a grafted polyol (e.g. Pluracol 994) and 0.2 php TCNE produced urethane foam with a volume resistivity of $8.55 \times 10^{10}$ ohm cm.

EXAMPLE 3

Resistance to Extraction and Aging of Non-reticulated TCNE Foam Materials

The permanence of the antistatic properties of the TCNE polyurethane foam produced in Example 2 was measured by extraction with hot water, extraction in JP-5 (petroleum jet fuel) and also by dry heat aging at 300° F., as shown in Table II. The JP-5 extraction test was conducted by continuously squeezing a 5"×5"×1" sample of the antistatic foam in JP-5 jet fuel for 5 minutes, wringing out the jet fuel, washing 1 minute in cold water, and drying at 158° F. The foam was then conditioned at room temperature at 50% relative humidity for 16 hours and the surface and volume resistivities was determined according to ASTM D 257. The procedure for testing in hot water was to immerse a foam sample 5"×5"×1" thick in 140° F. water squeezing for 5 minutes, remove the foam, wring out the water, allow the foam to dry at 158° F., condition at 50% relative humidity for 16 hours and then make surface and volume resistance measurements. Hot air aging was conducted in a hot air oven. After removal from the oven and cooling to ambient temperature the foam was conditioned at 50% humidity for 16 hours and the volume and surface resistivity was determined. The test results are reported in Table II, which indicates that the electrical conductivity conferred on the foam by foaming in situ with TCNE is essentially unaffected in foam material exposed to hot water and JP-5 jet fuel and that the antistatic properties resist dry heat aging.

TABLE II

| TCNE (php) | Treatment Conditions | Before Treatment | After Treatment |
|---|---|---|---|
| | Foam sample 5" × 5" × 1" thick. | | |
| 0.4 | Squeezed 5 min. in 140° F. water | | |
| | Surface Resistivity (ohms/sq.) | 4.40 E 10 | 9.80 E 10 |
| | Volume Resistivity (ohm cm) | 2.67 E 10 | 2.16 E 10 |
| | Squeezed 5 min. JP-5 | | |
| 0.4 | Surface Resistivity (ohms/sq.) | 5.26 E 10 | 1.90 E 10 |
| | Volume Resistivity (ohm cm) | 4.02 E 10 | 9.91 E 9 |
| | Dry heat aging at 300° F. | | |
| | 1. 1 hour | | |
| 0.1 | Surface Resistivity (ohms/sq.) | 1.46 E 12 | 2.45 E 12 |
| | Volume Resistivity (ohm cm) | 3.11 E 11 | 5.77 E 11 |
| | 2. 2 hours | | |
| 0.2 | Surface Resistivity (ohms/sq.) | 1.98 E 11 | 8.97 E 10 |
| | Volume Resistivity (ohm cm) | 8.55 E 10 | 7.66 E 10 |
| | 3. 3 hours | | |
| 0.2 | Surface Resistivity (ohms/sq.) | 1.98 E 11 | 1.22 E 11 |
| | Volume Resistivity (ohm cm) | 8.55 E 10 | 1.05 E 11 |

EXAMPLE 4

Resistance to Extraction and Aging in Reticulated TCNE/Polyurethane Foam Samples The foam products prepared in Example 2 but containing 0.1, 0.2, 0.3 and 0.4 php TCNE were thermally reticulated using the process of Geen U.S. Pat. No. 3,175,025 and thereafter samples were subjected to impregnation with hot water, autoclaving and dry heat aging. Thereafter the surface and volume resistivity of the foam samples (5"×5"×1"), each containing different amounts of TCNE, was tested.

The electrical conductivity of TCNE reticulated foam is not meaningfully affected by immersion in hot water, steam or by long exposure to dry heat. TCNE is permanently incorporated into the foam. As shown in Table III, under the severe conditions of one week autoclaved aging, volume resistivity remained substantially constant in a foam containing 0.4 php TCNE.

TABLE III

| TCNE (php) | Treatment Conditions | Before Treatment | After Treatment |
|---|---|---|---|
| | a. Squeezed 5 min. in 140° F. water | | |
| 0.3 | Surface Resistivity (ohms/sq) | 1.03 E 11 | 2.10 E 11 |
| | Volume Resistivity (ohms cm) | 5.05 E 10 | 1.41 E 11 |
| | b. Autoclaved 250° F. | | |
| 0.4 | 1. 5 hours | | |
| | Surface Resistivity (ohms/sq) | 5.95 E 10 | 1.07 E 11 |
| | Volume Resistivity (ohm cm) | 3.95 E 10 | 4.08 E 10 |
| | 2. 24 hours | | |
| 0.4 | Surface Resistivity (ohms/sq) | 5.15 E 10 | 4.10 E 10 |
| | Volume Resistivity (ohm cm) | 3.06 E 10 | 2.99 E 10 |
| | 3. 48 hours | | |
| 0.4 | Surface Resistivity (ohms/sq) | 5.15 E 10 | 2.62 E 10 |
| | Volume Resistivity (ohm cm) | 3.06 E 10 | 2.99 E 10 |
| | 4. 72 hours | | |
| 0.4 | Surface Resistivity (ohms/sq) | 5.15 E 10 | 2.82 E 10 |
| | Volume Resistivity (ohm cm) | 3.06 E 10 | 2.18 E 10 |
| | 5. 96 hours | | |
| 0.4 | Surface Resistivity (ohms/sq) | 5.15 E 10 | 3.32 E 10 |
| | Volume Resistivity (ohm cm) | 3.06 E 10 | 1.85 E 10 |
| | 6. 168 hours | | |
| 0.4 | Surface Resistivity (ohms/sq) | 5.15 E 10 | 1.84 E 10 |
| | Volume Resistivity (ohm cm) | 3.06 E 10 | 1.19 E 10 |
| | c. Dry Heat Aging at 284° F. | | |
| 0.2 | 1. 24 hours | | |
| | Surface Resistivity (ohms/sq) | 1.59 E 11 | 1.74 E 11 |

TABLE III-continued

| TCNE (php) | Treatment Conditions | Before Treatment | After Treatment |
|---|---|---|---|
|  | Volume Resistivity (ohm cm) | 7.89 E 11 | 1.03 E 11 |
|  | 2. 48 hours |  |  |
| 0.2 | Surface Resistivity (ohms/sq) | 1.59 E 11 | 2.72 E 11 |
|  | Volume Resistivity (ohm cm) | 7 89 E 11 | 1.58 E 11 |
|  | 3. 72 hours |  |  |
| 0.2 | Surface Resistivity (ohms/sq) | 1.59 E 11 | 3.85 E 11 |
|  | Volume Resistivity (ohm cm) | 7.89 E 11 | 1.73 E 11 |
|  | 4. 96 hours |  |  |
| 0.2 | Surface Resistivity (ohms/sq) | 1.59 E 11 | 5.83 E 11 |
|  | Volume Resistivity (ohm cm) | 7.89 E 11 | 1.29 E 11 |
|  | 5. 168 hours |  |  |
| 0.2 | Surface Resistivity (ohms/sq) | 1.58 E 11 | 4.26 E 11 |
|  | Volume Resistivity (ohm om) | 7.89 E 11 | 3.18 E 11 |

EXAMPLE 5

In Situ Reticulated TCNE Foams

Reticulated foams were prepared containing 0.1, 0.2, 0.3 and 0.4 parts TCNE. Except for TCNE which ranged from 0.1 to 0.4 php (as described above) the same formulations were used in these reticulated foams as were employed in making the non-reticulated foams of Example 2. The physical properties of these foam samples are shown in Table IV.

TABLE IV

|  | Parts TCNE | | | |
|---|---|---|---|---|
|  | 0.1 | 0.2 | 0.3 | 0.4 |
| A. Before Reticulation |  |  |  |  |
| Air Flow (cfm) | 0.5 | 1.0 | 6.0 | 7.0 |
| Density (pcf) | 1.23 (top) | 1.38 (top) | 1.48 | 1.36 (top) |
| 25% CLD (1) | 0.52 | 0.51 | 0.57 | 0.54 |
| Surface Resistivity | 6.75 E 11 | 2.44 E 11 | 8.35 E 10 | 4.63 E 10 |
| Volume Resistivity | 2.52 E 11 | 9.36 E 10 | 4.90 E 10 | 3.68 E 10 |
| After Reticulation |  |  |  |  |
| Air Flow (cfm) | 8.0 | 8.3 | 8.2 | 9.6 |
| Density (pcf) | 1.50 | 1.42 | 1.86 | 1.97 |
| 25% CLD | 0.42 | 0.48 | 0.67 | 0.67 |
| Surface Resistivity | 4.86 E 11 | 1.67 E 11 | 6.91 E 10 | 4.43 E 10 |
| Volume Resistivity | 1.60 E 11 | 6.46 E 10 | 5.22 E 10 | 3.92 E 10 |
| Tensile Strength (psi) | 21.1 | 22.0 | 24.1 | 21.5 |
| % Elongation | 260 | 270 | 210 | 200 |
| Tear Strength (psi) | 4.4 | — | — | 4.7 |

(1) Compression load deflection

Reticulation is not detrimental to the excellent conductive and antistatic properties imparted to polyurethane foam structures containing small quantities of TCNE, as shown by the substantially unchanged resistivity characteristics of the foam specimens before and after reticulation. Also, the TCNE did not adversely affect the strength of the foam.

While not being bound by any specific theory of operation for the invention it is believed that the resistance to extraction of TCNE, which accepts electrons from nitrogen-containing polymers in the foam, is due to formation of a chemical bond between the skeletal structure of the polyurethane and the TCNE during the in situ foam-forming operation.

EXAMPLE 6

Humidity Exposure Test

The electrical (volume) resistance of TCNE containing polyurethane foams made as in Example 2 was measured at various relative humidities from 7 to 99%.

Volume resistance measurements showed that polyurethane foam made with TCNE is not particularly sensitive to humidity changes. This is illustrated in the results of the humidity exposure test reflected in Table V below. Each foam specimen was exposed to room humidity of 7%, 50% and 99% for 16 hours. The foams tested below were samples (5"×5"×1") of the same foams used in Example 5 above.

TABLE V

|  | TCNE in Foam (php) | | | |
|---|---|---|---|---|
|  | 0.1 | 0.2 | 0.3 | 0.4 |
| Surface Resistivity (ohms/sq.) |  |  |  |  |
| 7% R.H. | 7.38 E 11 | 2.07 E 11 | 7.98 E 10 | 5.85 E 10 |
| 50% R.H. | 3.27 E 11 | 1.40 E 11 | 7.00 E 10 | 4.34 E 10 |
| 99% R.H. | 1.12 E 11 | 6.17 E 10 | 3.59 E 10 | 2.94 E 10 |
| Volume Resistivity (ohm cm) |  |  |  |  |
| 7% R.H. | 2.04 E 11 | 8.23 E 10 | 6.30 E 10 | 4.51 E 10 |
| 50% R.H. | 9.07 E 10 | 4.46 E 10 | 3.93 E 10 | 2.43 E 10 |
| 99% R.H. | 2.34 E 10 | 1.41 E 10 | 1.29 E 10 | 8.07 E 9 |

EXAMPLE 7

Carbon Black Plus TCNE

Figure 3:
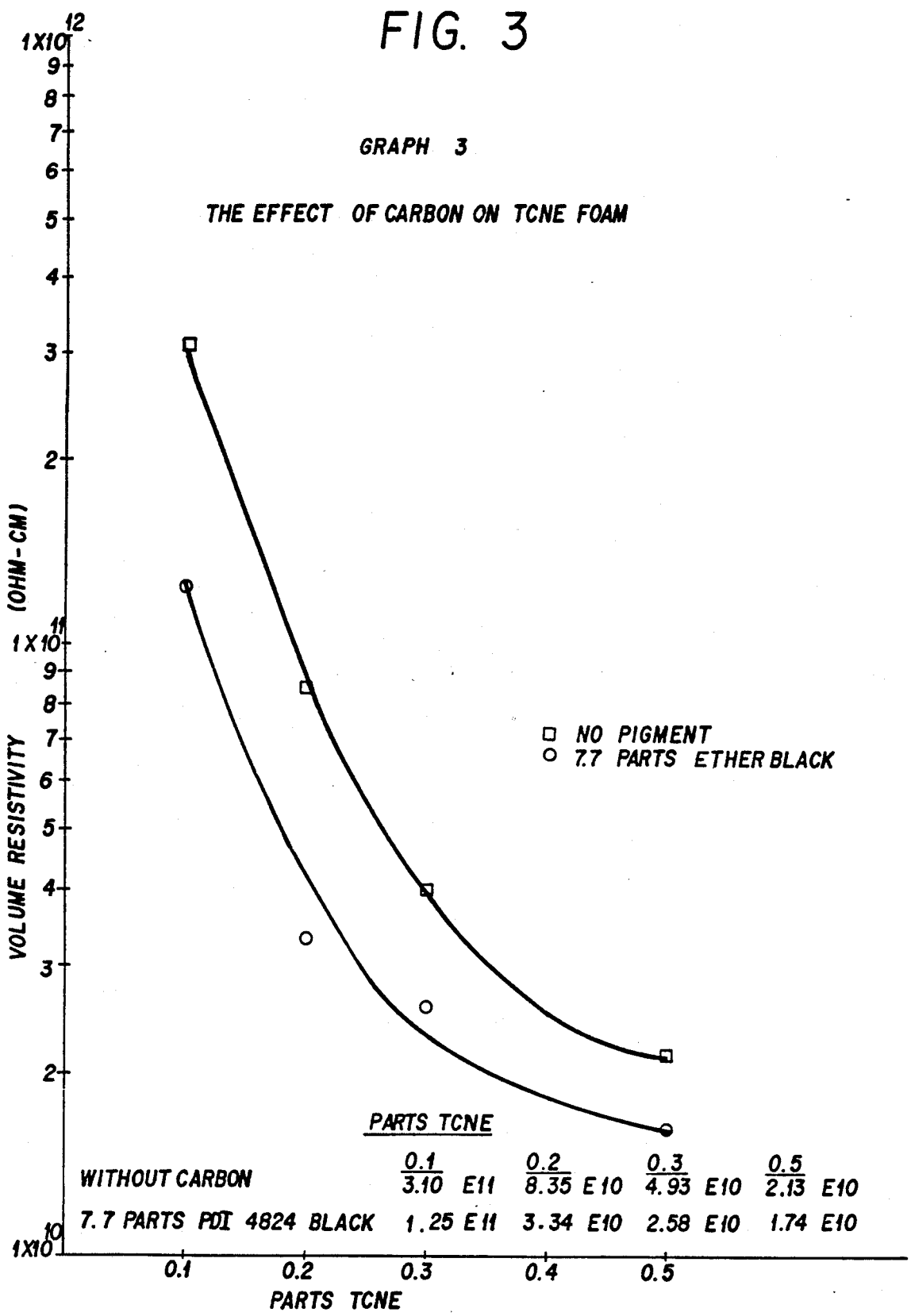
FIG. 3 is a graph showing the effect on electrical conductivity of adding carbon back to TCNE polyurethane foams.

The in situ incorporation of carbon black pigment into the foam further decreases its electrical resistance (and increases electrical conductivity), but only if TCNE is also present. This was confirmed by incorporating finely divided carbon black into polyurethane foam containing TCNE and prepared from the same constituents as in Example 2 but containing 0.1, 0.2, 0.3, 0.4 and 0.5 parts TCNE. FIG. 3 illustrates the enhanced conductivity of foam containing TCNE and carbon black. One suitable method for incorporating carbon in the foam reactants is to use an 18% dispersion of carbon in a polyether polyol (available from PDI as Dispersion No. 4824).

The conductivity enhancement realized by incorporation of carbon black pigment with TCNE was surprising since the incorporation of carbon pigment in reticulated 15 ppi polyurethane foam (80/20 TDI+Pluracol 637) does not appear to lower its resistance value. Several TCNE foams were prepared containing carbon black to confirm the synergistic effect of carbon black and TCNE in decreasing electrical resistance. The volume resistivity of these foams at different concentrations of TCNE was compared with that of non-pigmented TCNE foams. As shown in FIG. 3, the incorporation of carbon black pigment and TCNE in polyurethane foam forming ingredients does indeed lower the electrical resistance of the resulting polyurethane foam material beyond the decrease that is attainable with incorporation of TCNE alone.

TCNE is a solid agent, and its dispersion in a polyol yields a foam product with holes in the foam. Unless it is dissolved in a suitable solvent prior to admixture with the other foam forming reactants, combination of TCNE with such materials will not produce an acceptable electrically conductive three dimensional polyurethane foam product. Therefore, the TCNE must be dissolved in a suitable aqueous or organic solvent prior to combination with the other foam forming reactants. Water or any of a number of diverse organic solvents may be used to dissolve the TCNE, provided they are compatible with the foam material and do not hinder the foam forming process. Solutions containing between 1 and 10% TCNE and preferably 5–10% TCNE yield acceptable foam products and facilitate combination of TCNE and the other foam forming ingredients. Among the useful organic solvents for TCNE are Dipropylene glycol, Tris chloroisopropyl phosphate, Tris chloroethyl phosphate and TDI. Solutions of TCNE in PCF and CEF caused no detrimental effect on the electrical conductivity of the resulting foam product. Therefore, PCF and CEF are an especially preferred as TCNE solvents.

EXAMPLE 8

Two reticulated foam products were made pursuant to Example 2 but substituted respectively with Pluracol 994 (graft copolymer) and Pluracol 637 polyol graft copolymer formulation. The volume resistivity of each sample was measured and is shown in Table VI.

TABLE VI

Volume Resistivities of TCNE Foams Prepared With Different Polyol Systems

| Polyol | Parts TCNE | | |
|---|---|---|---|
| | 0.1 | 0.2 | 0.3 |
| 100% Pluracol 637 | 9.50 E 10 | 3.87 E 10 | 2.14 E 10 |
| 50% Pluracol 994:50% 16-56 | 1.25 E 11 | 3.34 E 10 | 2.58 E 10 |

It can be seen from the data in Table VI that the volume resistivities of TCNE foams prepared with the two polyol systems are approximately equivalent within the preferred TCNE ranges of the invention. Both 100% Pluracol graft copolymer 637 polyol and a 50:50 blend of Pluracol 994 and Niax 16-56 polyol can advantageously be used for the production of TCNE containing antistatic polyurethane foam.

EXAMPLE 9

Abrasion Resistance of Reticulated TCNE Foams

The resistance of a reticulated foam to mechanical abrasion was estimated by rubbing a 5"×5"×1" thick sample of a finished foam product on a medium emery paper twenty times. The foam product was made from the following reactants:

TABLE VII

| | Formulation A Parts | Formulation B Parts | Formulation C Parts |
|---|---|---|---|
| Pluracol 637 | 100 | 100 | 100 |
| 5% TCNE in PCF | 2.0 | 4.0 | 6.0 |
| PDI 4824 | 7.7 | 7.7 | 7.7 |
| L6202 | 1.0 | 1.0 | 1.0 |
| H$_2$O | 4.6 | 4.6 | 4.6 |
| 33LV | 0.4 | 0.4 | 0.5 |
| UL29 | 0.3 | 0.3 | 0.5 |
| TDI | 51 | 51 | 51 |

The results reported in Table VII(A) indicate that the electrical conductivity property of the TCNE foam is not eliminated or substantially diminished by mechanical abrasion.

TABLE VII(A)

| | Before Abrasion | After Abrasion |
|---|---|---|
| Formulation A | | |
| 0.1 Parts TCNE | | |
| Surface Resistivity (ohms/sq) | 2.14 E 11 | 1.97 E 11 |
| Volume Resistivity (ohm cm) | 7.41 E 10 | 6.83 E 10 |
| Formulation B | | |
| 0.2 Parts TCNE | | |
| Surface Resistivity (ohms/sq) | 5.12 E 10 | 5.18 E 10 |
| Volume Resistivity (ohm cm) | 3.14 E 10 | 2.94 E 10 |
| Formulation C | | |
| 0.3 Parts TCNE | | |
| Surface Resistivity (ohms/sq) | 3.49 E 10 | 5.31 E 10 |

TABLE VII(A)-continued

| | Before Abrasion | After Abrasion |
|---|---|---|
| Volume Resistivity (ohm cm) | 2.65 E 10 | 2.67 E 10 |

EXAMPLE 10

Temperature Resistance

The sensitivity of the electrical resistance values of TCNE foams to temperature was measured on several non-reticulated TCNE containing foam specimens made pursuant to Table VIII(A).

TABLE VIII(A)

| | Parts |
|---|---|
| Niax 16-56 | 100 |
| L6202 | 1.2 |
| H$_2$O | 4.6 |
| UL29 | .4 |
| 33LV | .3 |
| 5% Solution of TCNE in PCF | (0.02) (0.05) (0.1) (0.2) (0.3) |
| TDI | 53.2 |

Tests were performed at 40° F., 70° F., 158° F., and 300° F. The reticulated foam formulations contained TCNE ranging from 0.02 to 0.3 php. It was discovered that the conductivity of the TCNE foam is only slightly better as the temperature of the foam is increased. For example, at 0.02 parts TCNE, volume resistivity decreased from $3.52 \times 10^{11}$ at 40° F. to $1.00 \times 10^{11}$ at 300° F.

Table VIII(B) illustrates the slight decrease in volume resistivity with increased temperature of conventional (non-graft) polyurethane foams.

TABLE VIII(B)

The Effect of Temperature on Resistivity of TCNE Foam

| | Volume Resistivity (ohm cm) | | | | |
|---|---|---|---|---|---|
| | 0.02 parts TCNE php | 0.05 parts TCNE php | 0.1 parts TCNE php | 0.2 parts TCNE php | 0.3 parts TCNE php |
| 40° F. | 3.52 E 11 | 1.52 E 11 | 4.77 E 10 | 3.60 E 10 | 1.76 E 10 |
| 70° F. | 3.05 E 11 | 1.01 E 11 | 3.71 E 10 | 2.26 E 10 | 1.62 E 10 |
| 158° F. | 2.94 E 11 | 7.95 E 10 | 3.51 E 10 | 1.66 E 10 | 1.44 E 10 |
| 300° F. | 1.00 E 11 | 4.03 E 10 | 2.79 E 10 | 1.37 E 10 | 1.36 E 10 |

A particularly preferred formulation for the TCNE reticulated foam of the present invention is:

| Material | Preferred Parts |
|---|---|
| Pluracol 637 | 100 |
| TCNE | 0.2 |
| Fyrol PCF | 3.8 |
| L6202 | 1.0 |
| PDI black #4824 | 7.7 |
| Water | 4.6 |
| 33LV | 0.4 |
| UL29 | 0.3 |
| TDI (80/20) | 51.0 |

Water level of the foam material can be adjusted to give the density required, and can be varied between 1.4 php for a 6 pcf (pounds per cubic foot) foam to 5.0 php for a 1.4 pcf foam. Generally, the lower the water content of a foam material the lower the electrical resistance of the foam.

EXAMPLE 11

Electrically Conductive Picric Acid Foams

A wide variety of polyurethane foam compositions containing picric acid and analogs thereof as the charge transfer agent can be prepared, as illustrated below.

Formula 11 (PICRIC ACID)

A polyurethane antistatic foam was prepared by admixing the following ingredients on a conventional polyurethane foaming machine:

| Material | Parts |
| --- | --- |
| Poly G 32-52 a propoxylated ethoxylated glycerin (M W 3300) manufactured by Olin Chemicals, Stamford, Connecticut. | 100 |
| Picric Acid | 1.0 |
| Fyrol PCF | 5.0 |
| Water | 3.6 |
| Union Carbide Silicone L6202 is a silicone surfactant manufactured by Union Carbide. | 1.0 |
| Witco Tin Catalyst UL29 - is Diethyl tin mercaptide manufactured by Witco Chemical Corp., Chicago, Ill. | 1.5 |
| Dabco 33LV - a 33% solution of triethylene diamine in dipropylene glycol, manufactured by Air Products & Chemicals, Inc., Allentown, Pennsylvania | 1.2 |
| TDI 80/20 | 43.7 |

The resulting foam product had a rise time of 120 seconds, a density of 1.87 pcf, an airflow of 0.90 cfm, and a surface resistivity of 2.9 E 10 ohm/sq. This formula can be varied by replacing picric acid with electrically conductive analogs, such as those in Formulas 11(A–J), as shown below.

TABLE IX

| BASIC FOAM FORMULATION | (php) |
| --- | --- |
| 32-52 | 100 |
| FYROL PCF | 5.0 |
| WATER | 3.6 |
| L6202 | 1.0 |
| UL29 | 1.0 |
| 33LV | 1.0 |
| TDI (80/20) | 43.7 |
| CHARGE TRANSFER AGENT | 1.0 |

The following data was obtained for each tested picric acid analog. (Note that FYROL PCF was omitted in Formulas H and J).

| | SURFACE RESISTIVITY FOR PICRIC ACID ANALOGS | | | | |
| --- | --- | --- | --- | --- | --- |
| FORMULA | CHARGE TRANSFER AGENT | RESISTIVITY OHMS/SQ. | RISE TIME | DENSITY PCF | AIRFLOW CFM |
| A | 2,4-DINITROPHENOL | 4.3 E 10 | 90 s | 1.79 | 3.3 |
| B | 2,5-DINITROPHENOL | 9.1 E 10 | 49 s | 1.72 | 1.79 |
| C | 4-NITROPHENOL | 1.0 E 11 | 37 s | 1.68 | 0.12 |
| D | 4-CYANOPHENOL | 1.4 E 11 | 34 s | 1.70 | 0.14 |
| E | 3-NITROPHENOL | 2.0 E 11 | 28 s | 1.66 | 0.08 |
| F | 2,4-DINITROANISOL | 2.4 E 11 | 36 s | 1.62 | 0.15 |
| G | 2-NITROPHENOL | 4.3 E 11 | 30 s | 1.64 | 0.31 |
| H | 2-HYDROXYACETOPHENONE | 4.8 E 11 | 26 s | 1.58 | 0.18 |
| I | 4-HYDROXYACETOPHENONE | 5.4 E 11 | 31 s | 1.65 | 0.15 |
| J | METHYL SALICYLATE | 1.4 E 12 | 30 s | 1.63 | 0.09 |
| CONTROL | NONE | 2.4 E 12 | 30 s | 1.58 | 0.14 |

All of these exemplary picric acid analogs exhibit effective antistatic properties, except methyl salicylate. Typical surface resistivity values for picric acid and its analogs is about 5.6 E 10 ohm/sq. for 0.5 php, and 2.4 E 12 for 1.0 php of charge transfer agent. When no picric acid analog is used, the resistivity is about 2.9 E 10.

Although most of the formulations in the above examples use PCF as a solvent for picric acid, or an antistatic analog thereof, other solvents can also be used. For example, generally equivalent results are obtained using 16.7% picric acid in Fyrol CEF or Dipropylene glycol, or 25% picric acid in Thermolin 101 or Antiblaze 100.

EXAMPLE 12

Additional Antistatic Picric Acid Formulations

A number of additional foam formulations and picric acid analogs have been tested, and exhibit antistatic properties.

Formula 12(A)

A polyurethane foam was prepared by admixing the following ingredients on a conventional polyurethane foaming machine:

| Material | Parts |
| --- | --- |
| Pluracol 718 - a standard 3000 molecular weight ethoxylated propoxylated glycerin polyol manufactured by BASF. | 100 |
| Silicone L520 is a silicone surfactant manufactured by Union Carbide Corp. | 1.0 |
| Water | 4.1 |
| T-120 Dibutyl tin mercaptide, manufactured by M&T Chemicals, Inc., Rahway, N.J. | 1.2 |
| Niax A-4, a tertiary amine mixture made by Union Carbide Corp. | 1.2 |
| 16% solution of picric acid in Fyrol PCF-tri(chloropropyl) Phosphate, made by Stauffer Chemical Co., Westport, CT. | 6.0 |
| TDI 80/20 | 49.3 |

The resulting foam product has a surface resistivity of 1.6 E 9 ohms/square.

Formula 12(B)

A polyurethane antistatic foam was prepared by admixing the following ingredients in a conventional polyurethane foaming process:

| Material | Parts |
| --- | --- |
| Poly G 32-52, A propoxylated ethoxylated glycerin (MW 3300) made by Olin Chemicals | 100 |
| Silicone L6202, a silicone surfactant manufactured by Union Carbide Corp. | 1.0 |
| Water | 4.3 |
| T-125 Dibutyl tin dialkyl acid, made by M&T Chemicals, Inc., Rahway, N.J. | 1.0 |
| Niax A-1, Dimethyl aminoethyl ether 10% in dipropylene glycol, made by Union Carbide | 1.0 |
| 16.7% solution of picric acid in Fyrol PCF | 3.0 |
| Lupranate M-10, a polymeric diphenylmethane | 73.3 |

| Material | Parts |
|---|---|
| diisocyanate made by BASF. | |

After cooling, the resulting three-dimensional foam product has a surface resistivity of 1.65 E 11 ohms/square, demonstrating excellent antistatic properties.

Formula 12(C)

A polyurethane antistatic ester foam was prepared by admixing the following ingredients in a conventional polyurethane foaming process:

| Material | 1 | 2 | 3 |
|---|---|---|---|
| Fomrez 76, a hydroxyl terminated ester specifically glycerine adipate polyoxyethylene, made by Witco Chemical. | 100 | 100 | 100 |
| N—cocomorpholine | 1.5 | 1.5 | 1.5 |
| Thancat M-75, a tertiary amine blend made by Texaco Chemical Co. | 1.8 | 1.8 | 1.8 |
| Water | 4.0 | 4.0 | 4.0 |
| L-536, a silicon surfactant made by Union Carbide Corp. | 0.7 | 0.7 | 0.7 |
| Fomrez M66-82A, a mixture of surfactants made by Witco | 0.6 | 0.6 | 0.6 |
| Fomrez YA 49-49, an organic hydroxyl terminated ester crosslinker, made Witco Chemical. | 0 | 4.0 | 4.0 |
| 16% solution of picric acid in Fyrol PCF | 3.0 | 6.0 | 9.0 |
| TDI 80/20 | 52.7 | 52.7 | 52.7 |
| SURFACE RESISTIVITY (OHM/SQ.) | 2.5 E 11 | 1.4 E 11 | 1.0 E 11 |
| VOLUME RESISTIVITY (OHM CM) | 1.0 E 11 | 6.0 E 10 | 3.5 E 10 |

These examples illustrate the excellent antistatic properties of ester foams containing picric acid.

Formula 12(D)

A series of antistatic ether foams were prepared as follows, with amounts given as parts per hundred polyol (php).

| MATERIAL | 1 | 2 | 3 | 4 | 5 | 6 |
|---|---|---|---|---|---|---|
| Niax 16-56 | 100 | 100 | 100 | 100 | 100 | 100 |
| L6202 | 1.1 | 1.1 | 1.0 | 1.0 | 0.9 | 0.9 |
| Water | 4.7 | 4.7 | 4.1 | 4.1 | 3.4 | 3.4 |
| Fomrez UL29 | 0.8 | 1.2 | 0.8 | 1.5 | 0.8 | 1.2 |
| Dabco 33LV | 0.8 | 1.2 | 0.8 | 1.2 | 0.8 | 1.2 |
| 16% Picric Acid/PCF | 3.0 | 6.0 | 3.0 | 6.0 | 3.0 | 6.0 |
| Methylene chloride | 5.0 | 5.0 | 0 | 0 | 0 | 0 |
| TDI (80/20) | 60.6 | 60.6 | 49.3 | 49.3 | 47.0 | 47.0 |
| DENSITY (PCF) | 1.25 | 1.25 | 1.62 | 1.65 | 1.82 | 1.83 |
| SURFACE RESISTIVITY | 7.4 E 11 | 7.4 E 10 | 6.0 E 10 | 3.2 E 10 | 5.6 E 10 | 2.8 E 10 |
| STATIC DECAY | 1.0 | 0.3 | 0.3 | =0.1 | 0.4 | =0.2 |

Niax 16-56 is a 3000 molecular weight polyol, manufactured by Union Carbide Corp. The surface resistivity is measured as ohm/square. The static decay was measured at 5000–50 volts (sec), and the relative humidity was 15%.

It has been observed that as the density of these foams increase, the surface resistivity decreases. All of these foams meet the electrical specifications of MIL B-81705B for packaging materials for electrostatic devices and explosives.

Formula 12(E)

A series of graft foams were prepared as follows, with amounts given as parts per hundred polyol (php).

| MATERIAL | 1 | 2 | 3 | 4 | 5 | 6 |
|---|---|---|---|---|---|---|
| Pluracol 994 | 50 | 50 | 50 | 50 | 90 | 90 |
| Niax 16-56 | 50 | 50 | 50 | 50 | 10 | 10 |
| L6202 | 1.0 | 1.0 | 0.9 | 0.9 | 0.7 | 0.7 |
| Water | 5.0 | 5.0 | 4.5 | 4.5 | 2.75 | 2.75 |
| Dabco 33LV | 0.7 | 1.1 | 0.8 | 1.2 | 0.7 | 1.1 |
| Fomrez UL29 | 0.6 | 1.0 | 0.8 | 1.2 | 0.7 | 1.1 |
| 16% Picric Acid in PCF | 3.0 | 6.0 | 3.0 | 6.0 | 3.0 | 6.0 |
| TDI (80/20) | 57.8 | 57.8 | 55.1 | 55.1 | 35.8 | 35.8 |
| DENSITY (PCF) | 1.16 | 1.25 | 1.40 | 1.41 | 2.10 | 2.20 |
| SURFACE RESISTIVITY | 1.6 E 11 | 8.4 E 10 | 3.1 E 11 | 1.8 E 11 | 9.7 E 10 | 3.5 E 10 |
| STATIC DECAY | 1.2 | 0.6 | 1.3 | 0.8 | 0.8 | 0.3 |

Pluracol 994 is a graft polyol of 40% acrylonitrile styrene copolymer grafted on an ethoxylated propoxylated glycerine (MW 5600), manufactured by BASF. The surface resistivity is measured as ohm/square. The static decay is measured at 5000–50 volts (sec), and the relative humidity was 15%.

These picric acid graft foams exhibit excellent antistatic properties.

Formula 12(F)

A series of picric acid foams were prepared according to the following basic formulation, with varying amounts of picric acid.

| | |
|---|---|
| Pluracol 637 | 100 |
| L6202 | 1.0 |
| Water | 4.6 |
| Dabco 33LV | 0.2–1.4 |
| Fomrez UL29 | 0.3–1.5 |
| 16.7% picric acid in PCF | 0.1–12 |
| TDI 80/20 | 49.8 |

Pluracol 637 is a 20% acrylonitrile styrene copolymer grafted to an ethoxylated propoxylated glycerin polyol (MW 4200), manufactured by BASF.

These foams exhibited the following resistivities:

TABLE X

| FOAM | PICRIC ACID (php) | VOLUME RESISTIVITY (OHM CM) |
|---|---|---|
| 1 | 0.017 | 5.0 E 12 |
| 2 | 0.034 | 1.9 E 12 |
| 3 | 0.05 | 5.9 E 11 |
| 4 | 0.10 | 2.0 E 11 |
| 5 | 0.20 | 1.1 E 11 |
| 6 | 0.30 | 6.4 E 10 |
| 7 | 0.40 | 4.4 E 10 |
| 8 | 0.50 | 2.5 E 10 |
| 9 | 1.0 | 1.7 E 10 |
| 10 | 1.5 | 1.4 E 10 |
| 11 | 2.0 | 1.1 E 10 |

Figure 4:
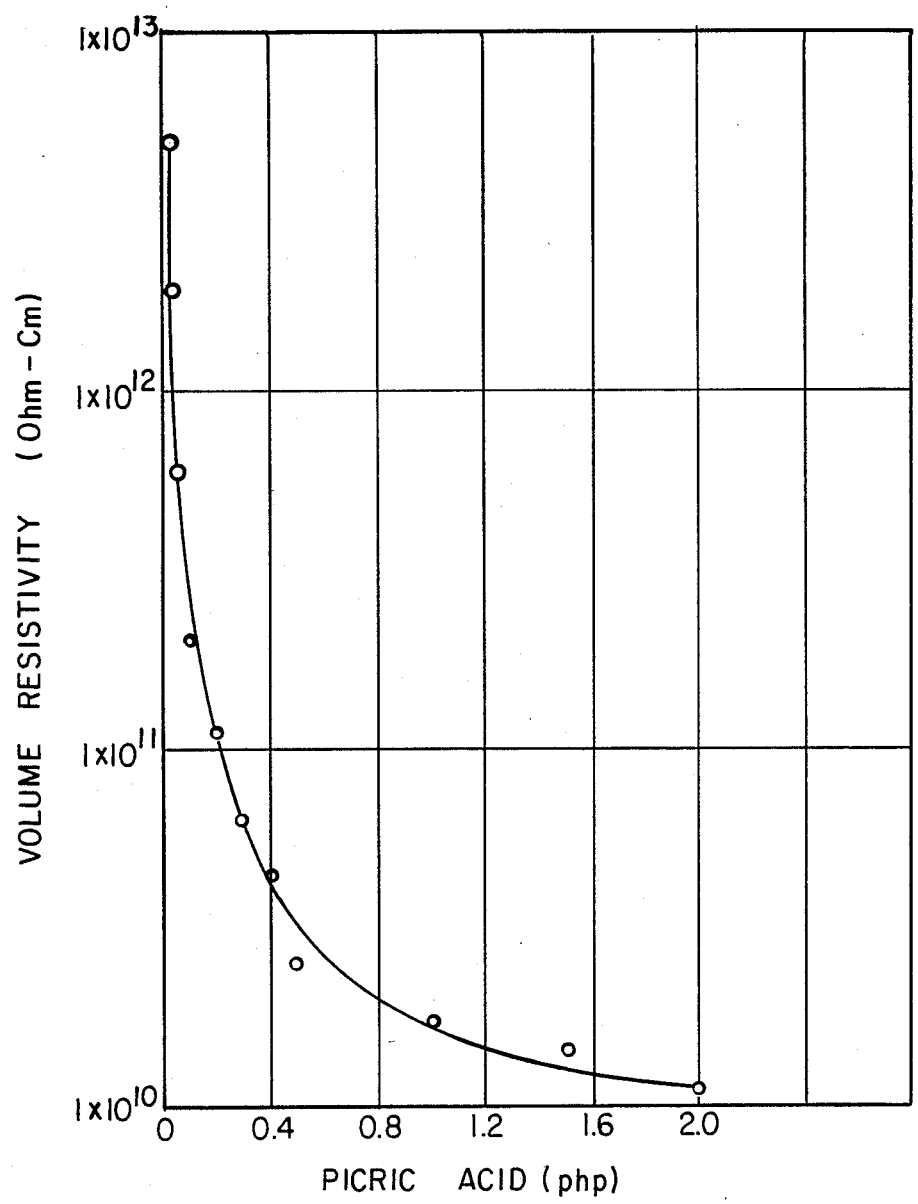
FIG. 4 is a graph showing the volume resistivity of picric acid foam as a function of in situ picric acid concentration.

This example illustrates the excellent antistatic properties that can be obtained in picric acid foams at low concentrations. As shown in FIG. 4, as the concentration of picric acid in the foam rises, the decrease in resistivity decreases.

Formula 12(G)

Fire retardant antistatic foam were prepared using picric acid using the following formulations:

| | Parts | |
|---|---|---|
| Material | 1 | 2 |
| Poly G 32-52 | 100 | 100 |
| L-5750 | 1.0 | 1.0 |
| Water | 4.7 | 4.7 |
| Dabco 33LV | 0.8 | 0.8 |
| Fomrez UL29 | 0.8 | 0.8 |
| Methylene Chloride | 5.0 | 5.0 |
| 16.7% picric acid in Fyrol PCF | 3.0 | 3.0 |
| Thermolin 101 | 15.0 | 0 |
| Antiblaze 100 | 0 | 15.0 |
| TDI 80/20 | 61.0 | 59.4 |
| DENSITY (PCF) | 1.25 | 1.25 |
| AIR FLOW (CFM) | 1.4 | 1.0 |
| ASTM D-1692 | S.E. | S.E. |
| SURFACE RESISTIVITY (ohms/sq.) | 4.7 E 10 | 4.4 E 10 |

L5750 is a silicone surfactant manufactured by Union Carbide Corp. Thermolin 101 is Tetrakis (2-chloroethyl) diphosphate, manufactured by Olin. Antiblaze 100 is a chloroalkyl diphosphate ester, made by Mobil Chemical Co.

This example shows the excellent antistatic properties of flame retardant foams containing picric acid.

Formula 12(H)

A prepolymer was made using the following formulations:

| Material | Parts |
|---|---|
| Pluracol 994 | 50 |
| Poly G 32-52 | 50 |
| TDI 80/20 | 30 |

This prepolymer had a Brookfield viscosity of 8000 cps. It was used to prepare a picric acid antistatic foam using the following formulation.

| Material | Parts |
|---|---|
| Prepolymer | 130 |
| L6202 | 1.0 |
| Water | 4.6 |
| Dabco 33LV | 1.0 |
| Fomrez UL29 | 0.5 |
| 16.7% picric acid in Fyrol PCF | 3.0 |
| TDI 80/20 | 20.8 |

This foam had the following resistivities:

| | |
|---|---|
| SURFACE RESISTIVITY (ohms/square) | 2.5 E 11 |
| VOLUME RESISTIVITY (ohms cm) | 6.8 E 10 |

These foams have good antistatic properties and can be prepared using a prepolymer technique, as well as a "one shot" method.

EXAMPLE 13

Hot Water Extraction

Foam 7 from Formula 12(F) (TABLE X) was washed for 5 minutes in 140° F. water. While washing, the foam was compressed and relaxed under the hot water to insure maximum water extraction of the antistatic agent. The foam was then dried for 3 hours at 158° F. and conditioned for 16 hours at 75° F. and 50% relative humidity before measurement of its resistivity. The results are shown in Table XI.

TABLE XI

| CONDITIONS | VOLUME RESISTIVITY (OHMS CM) |
|---|---|
| No treatment | 4.4 E 10 |
| 1 Hot water wash | 1.4 E 11 |
| 2nd Hot water wash | 2.4 E 11 |

These data indicate that picric acid is only slowly extracted from the foam by hot water.

EXAMPLE 14

Cold Water Extraction

A sample of foam 9 from Formula 12(F) (Table X) was submerged in water and placed in a 160° F. oven. This foam was removed weekly, dried, conditioned and its resistivity was measured. The water was changed weekly. Following are the results of this test.

TABLE XII

| CONDITIONS | VOLUME RESISTIVITY (OHMS CM) |
|---|---|
| Unaged | 1.7 E 10 |
| 1 week | 2.1 E 10 |
| 2 weeks | 6.1 E 10 |
| 3 weeks | 9.1 E 10 |

TABLE XII-continued

| CONDITIONS | VOLUME RESISTIVITY (OHMS CM) |
|---|---|
| 4 weeks | 1.7 E 11 |

These data indicate that the picric acid was slowly extracted from the foam by water.

EXAMPLE 15

Graft Foams

Graft antistatic foams were prepared using the following formulations:

| Material | Parts 1 | Parts 2 |
|---|---|---|
| Pluracol 637 | 100 | 100 |
| L6202 | 1.0 | 1.0 |
| Water | 4.4 | 4.4 |
| Dabco 33LV | 1.0 | 1.0 |
| Fomrez UL29 | 1.4 | 1.2 |
| 16.7% picric acid in Fyrol PCF | 6.0 | 0 |
| 25% picric acid in Thermolin 101 | 0 | 4.0 |
| Forest green | 2.0 | 2.0 |
| TDI 80/20 | 51.8 | 49.8 |
| DENSITY (PCF) | 1.42 | 1.45 |
| AIR FLOW (CFM) | 1.10 | 1.50 |
| VOLUME RESISTIVITY (ohms/sq.) | 7.2 E 10 | 3.9 E 10 |

Forest green is a pigment dispersion No. 4474, manufactured by Pigment Dispersions Inc., Edison, N.J.

These foams were reticulated and their resistivity was measured:

| VOLUME RESISTIVITY (ohm cm) | 5.0 E 10 | 4.3 E 10 |
|---|---|---|

These data indicate that there is no loss in conductive properties caused by the thermal reticulation process.

EXAMPLE 16

Endurance Tests

The reticulated foams of the previous Example were exposed to the following treatments and their resistivity was measured:

| | | 1 | 2 |
|---|---|---|---|
| 1. | 5 min extraction in methylene chloride | 2.7 E 11 | 2.7 E 11 |
| 2. | Dry heat aging 3 hrs 300° F. | 5.5 E 10 | 5.0 E 10 |
| 3. | Water extraction at 158° F. | | |
| | 1 week | 6.1 E 11 | 4.5 E 11 |
| | 2 weeks | 1.3 E 12 | 8.4 E 11 |
| | 3 weeks | 4.5 E 12 | 3.0 E 12 |

These data indicate that picric acid is slowly extracted by water, extracted by methylene chloride and essentially unaffected by dry heat aging.

EXAMPLE 17

Comparative Example

A flexible antistatic foam was made using the following ingredients:

| Material | Parts |
|---|---|
| Pluracol 994LV | 50 |
| Niax 16-56 | 50 |

-continued

| Material | Parts |
|---|---|
| Larostat 377 DPG | 5.0 |
| Thermolin 101 | 5.0 |
| B8028 | 1.0 |
| Water | 3.4 |
| Niax A-10 | 0.3 |
| Dimethyl benzyl amine | 0.8 |
| T-12 | 0.1 |
| Methylene chloride | 4.0 |
| TDI 80/20 | 44.5 |

Larostat 377 DPG is an alkyl dimethyl ammonium ethosulfate dissolved in dipropylene glycol, manufactured by Jordon Chemical Co., Folcroft, PA. B8028 is a silicone surfactant, manufactured by Goldschmidt Chemical Corp., Hopewell, VA. Niax A-10 is an amine glycol mixture, manufactured by Union Carbide Corp. T-12 is dibutyl tin dilaurate, manufactured by M & T Chemicals Inc.

This foam had a surface resistivity of 1.8 E 11 ohms/square. The foam was reticulated. After reticulation, this foam had a surface resistivity of 3.5 E 11 ohms/square.

The reticulated foam containing the quaternary amine antistatic agent was extracted with water and methylene chloride with the following results:

| | SURFACE RESISTIVITY (ohms/sq.) |
|---|---|
| 5 min methylene chloride | 1.1 E 12 |
| 5 min cold water | 7.9 E 11 |

These data indicate that the quaternary amine is rapidly extracted with water and methylene chloride.

EXAMPLE 18

Additional Analogs

Various picric acid analogs were evaluated as antistatic charge transfer agents, as shown below:

TABLE XIII 1. 1 part 4-nitroanisole in 5 parts Fyrol CEF
2. 1 part 4-aminoacetophenone in 5 parts Fyrol CEF
3. 1 part 4-nitrobenzyl alcohol in 5 parts Fyrol CEF
4. 1 part 2-nitroaniline in 5 parts Fyrol CEF
5. 1 part 2,4-dihydroxyacetophenone in 5 parts Fyrol CEF
6. 1 part 4-nitrocatechol in 5 parts Fyrol PCF
7. 1 part 4-nitro-1-naphthol in 43.7 parts TDI
8. 1 part 4-nitrobenzophenone in 43.7 parts TDI
9. 1 part 4-nitrobenzaldehyde in 43.7 parts TDI
10. 1 part 5-nitroanthranilonitrile in 5 parts dimethyl formamide (DMF)
11. 1 part 2,6-dinitrocresol in 5 parts Fyrol CEF
12. 1 part 4-nitroaniline in 5 parts DMF
13. 1 part 2,4-dinitroaniline in 5 parts DMF
14. 2-nitroanisole-liquid used directly
15. 1 part 4-nitrobenzonitrile in 5 parts DMF and 10 parts CEF
16. 1 part 4-nitroacetanilide in 5 parts DMF
17. 1 part 2,4-dinitro-1-napthol sodium salt dihydrate (Martius yellow) in 7.5 parts DMF These preparartions were incorporated in foams using 1 php of the analog to be evaluated.

The following foam formulation was used:

| Material | Parts |
|---|---|
| 32-52 | 100 |
| L6202 | 1.0 |
| Water | 3.4 |
| Evaluated Compound | 1.0 |
| Dabco 33LV | 0.5-1.0 |
| UL29 | 1.0 |
| TDI | 43.7 |

These foams had the properties shown in Table XIV.

TABLE XIV

| Additive | Rise Time (sec) | Air Flow (cfm) | Density (pcf) | Surface Resistivity (ohms/sq) | Temp. (F) % Relative Humidity |
|---|---|---|---|---|---|
| 1. 4-nitroanisol | 26 | 0.3 | 1.7 | 6.1 E 11 | 74/45 |
| 2. 4-aminoacetopheone | 28 | 0.26 | 1.7 | 9.2 E 11 | 74/45 |
| 3. 4-nitrobenzyl alcohol | 27 | 0.4 | 1.7 | 6.7 E 11 | 74/45 |
| 4. 2-nitroaniline | 25 | 0.5 | 1.7 | 3.9 E 11 | 74/45 |
| 5. 2,4-dihdroxyacetophenone | 27 | 0.25 | 1.7 | 4.4 E 11 | 74/45 |
| 6. 4-nitrocatechol | 54 | 0.4 | 1.9 | 8.0 E 10 | 74/45 |
| 7. 2-nitro-1-naphthol | 27 | 0.21 | 1.6 | 1.0 E 12 | 74/45 |
| 8. 4-nitrobenzophenone | 29 | 0.14 | 1.8 | 1.9 E 12 | 74/45 |
| 9. 4-nitrobenzaldehyde | 30 | 0.09 | 1.6 | 1.0 E 12 | 74/45 |
| 10. 5-nitroanthranilonitrile | | 2.3 | 1.7 | 4.9 E 11 | 74/40 |
| 11. 2,6-dinitrocresol | 119 | 3.3 | 1.9 | 1.4 E 11 | 74/40 |
| 12. 4-nitroaniline | 42 | 6.3 | 1.7 | 6.4 E 11 | 74/40 |
| 13. 2,4-dinitroaniline | 38 | 3.8 | 1.6 | 3.6 E 11 | 74/40 |
| 14. 2-nitroanisole | 54 | 0.35 | 1.7 | 1.4 E 12 | 74/40 |
| 15. 4-nitrobenzonitrile | 50 | 1.21 | 2.1 | 1.5 E 11 | 72/43 |
| 16. 4-nitroacetanilide | 41 | 1.45 | 1.9 | 4.3 E 11 | 72/43 |
| 17. 2,4-dinitro-1-naphthol sodium salt dihydrate (Martius Yellow) | 36 | 2.35 | 1.8 | 2.3 E 10 | 72/43 |

Of these seventeen compounds, all but four easily reduced the surface resistivity below 1 E 12, but none of the compounds evaluated were as effective as picric acid (2.9 E 10), which has an effective range of about 0.015 (0.02) to 2.5 php in urethane form.

EXAMPLE 19

Both 4-nitrophenol and 2,4-dinitrophenol exhibit antistatic properties in urethane foam. Foams were prepared using the following formulation:

| Material | Parts |
|---|---|
| 32-52 | 100 |
| L 6202 | 1.0 |
| Water | 3.4 |
| 4-nitrophenol or 2,4 dinitrophenol | 0.5, 1.0, 2.0 |
| Dabco 33LV | 0.3, 1.0, 1.2 |
| UL29 | 0.2, 1.0, 1.5 |
| TDI 80/20 | 43.7 |

The surface resistivity of these foams was:

| | Surface Resistivity (ohms/square) | | |
|---|---|---|---|
| | 0.5php | 1.0php | 2.0php |
| 2,4 dinitrophenol | 2.0 E 11 | 4.3 E 10 | 1.3 E 10 |
| 4-nitrophenol | 2.0 E 11 | 1.0 E 11 | 5.2 E 10 |
| Picric Acid-control | 5.6 E 10 | 2.9 E 10 | |

These compounds show antistatic properties in urethane foam, which increases as their concentration increases.

EXAMPLE 20

Rebonded Foam

An antistatic rebonded foam having applications as a package foam for sensitive electronic equipment was prepared, with picric acid as an antistatic agent.

A prepolymer was prepared using the following materials:

| Material | Parts |
|---|---|
| Poly G 32-52 | 337 |
| TDI | 120 |

Thirty grams of shredded foam were sprayed with 42 grams of the following mixture:

| Material | Parts |
|---|---|
| Prepolymer | 6 |
| 16.7 picric acid in Fyrol PCF | 6 |
| Methylene Chloride | 30 |

The prepolymer antistatic coated foam was then sprayed with water while the foam was mixing.

The foam was compressed and cured 5 minutes at 210° F., 30 minutes at 160° F. and taken out of the mold. The rebonded foam article was then given a final 5 minute cure at 210° F.

This rebonded foam had the following properties.

| DENSITY (PCF) | 3.1 |
|---|---|
| SURFACE RESISTIVITY (ohms/sq.) | 1.3 E 10 |

This example illustrates the excellent antistatic properties of a rebonded foam containing picric acid.

It has been found that foaming with in situ TCNE, picric acid and analogs thereof produces adequate antistatic properties in conventional foams with as little as about 0.02 php of the charge transfer agent. Foams made with graft polyols preferably have approximately at least 0.1 php to achieve acceptable electrical conductivity when TCNE is the charge transfer agent. With graft polyol foams containing up to 2.5 php of charge transfer agent (e.g., TCNE), the electrical resistivity of the finished foam decreases as the level of agent is increased, but the rate of decrease declines as the level increases. As with other polyurethane foam products, the amount of TDI employed in the foam forming reaction depends on the hydroxyl number of the polyol and the amount of water in the formulation.

Although thermal reticulation of the foam products is preferred (due to cost and speed consideration) the other reticulation techniques that are well known in the art including, for example, immersion of the foam in dilute alkaline solution and exposure to high pressure water and ultra sound may also be used to reticulate conductive foams made with the charge transfer agents, according to the invention.

The electrically conductive foam materials of the present invention may be employed in a variety of military, industrial and consumer applications. When shaped in the appropriate configuration and sized to the proper dimension charge transfer agent containing polyurethane foam products can be used for example as packaging material for voltage sensitive computer parts to protect them against static electric discharges (e.g. Large Scale Integrated Circuits), in medical applications (e.g. as grounding mats for operating room equipment) or as an antistatic carpet underlayer. A particularly preferred application for the three-dimensional reticulated charge transfer agent containing foam materials of the present invention is as a filler material in vehicular fuel tanks and especially those installed in military aircraft or racing cars.

What is claimed is:

1. A three dimensional electrically conductive plastic foam structure comprising a polyurethane foam containing an effective amount for lowering the volume resistivity of said foam of tetracyanoethylene.

2. A three dimensional electrically conductive structure according to claim 1, wherein said structure is prepared by reacting a polyol and an isocyanate and comprises 0.02 to 2.5 parts per hundred parts by weight of said polyol of said tetracyanoethylene.

3. A three dimensional electrically conductive structure according to claim 2 wherein said polyurethane foam comprises a reticulated polyurethane foam.

4. A three dimensional electrically conductive structure according to claim 3, wherein the polyurethane foam comprises at least one graft polyol reacted with an isocyanate in the presence of said tetracyanoethylene.

5. A three dimensional electrically conductive structure according to claim 4, wherein said tetracyanoethylene is dissolved in a suitable solvent prior to reaction with said polyol and said isocyanate.

6. A three dimensional electrically conductive structure according to claim 3, wherein the polyurethane foam is formed from a graft polyol comprising a copolymer of styrene and acrylonitrile grafted to an ethylene oxide propylene oxide ether of glycerin.

7. A three dimensional electrically conductive structure according to claim 6, wherein the polyurethane foam is formed from 0.02 to 2.5 parts tetracyanoethylene in a foam compatible organic solvent, 0 to 2.2 parts carbon black, 1 to 8 parts water, in parts per hundred parts of said polyol.

8. A three dimensional electrically conductive structure according to claim 7, prepared from foam reactants containing at least one catalyst.

9. A three dimensional electrically conductive structure according to claim 8 wherein the solvent is a member selected from the group consisting of dipropylene glycol, chloroisopropyl phosphate and Tris-chloroethyl phosphate, and containing from 2 to 10 percent of said solvent of tetracyanoethylene.

10. A three dimensional electrically conductive structure according to claim 3, wherein the polyurethane foam has a void volume greater than 80%.

11. A three dimensional electrically conductive structure according to claim 3, wherein the polyurethane foam has a void volume greater than 90%.

12. A three dimensional electrically conductive structure according to claim 11, wherein the effective amount of tetracyanoethylene is from 0.1 to 1.5 parts per hundred parts of polyol.

13. A three dimensional electrically conductive structure having a volume resistivity of less than $10^{12}$ ohm cm, comprising
a polyurethane foam containing an effective amount for reducing the electrical resistance of said foam to less than $10^{12}$ ohm cm of tetracyanoethylene incorporated into said foam in situ.

14. A three dimensional electrically conductive plastic foam structure according to claim 13, wherein said tetracyanoethylene is in an amount ranging from 0.02 to 2.5 php.

15. A three dimensional electrically conductive structure according to claim 14, additionally comprising finely divided carbon black pigment incorporated into said foam in situ.

16. A three dimensional electrically conductive structure according to claim 13, wherein said polyurethane foam is thermally reticulated by momentary exposure to an ignited combustible gas in a sealed chamber.

17. A method of preparing an electrically conductive polyurethane foam composition which comprises:
reacting at least one polyester or polyether polyol with an isocyanate compound in the presence of an effective amount for lowering the electrical resistance of said polyurethane foam of tetracyanoethylene under foam forming conditions.

18. A method according to claim 17 wherein said electrically conductive polyurethane foam has an electrical resistance of less than $10^{12}$ ohm cm.

19. A method according to claim 18, wherein said tetracyanoethylene is present in an amount of 0.2 to 2.5 php.

20. A method according to claim 18, wherein said tetracyanoethylene is present in an amount of 1.0 to 1.5 php.

21. A method according to claim 18, wherein said polyol comprises a graft polyol.

22. A method of according to claim 18, which comprises adding finely divided carbon black pigment to said foam reactants prior to or during said reacting step.

23. A method according to claim 21, wherein the isocyanate compound comprises toluene diisocyanate, the effective amount of tetracyanoethylene ranges from between about 0.02 to about 2.5 parts per hundred parts polyol dissolved in a polyurethane foam compatible solvent.

24. A method of preparing an electrically conductive polyurethane foam composition having an electrical resistance of $10^{12}$ ohm cm or less comprising the steps of:
reacting at least one graft polyol with toluene diisocyanate in the presence of water, an amine catalyst, a tin catalyst, a cell control agent and an effective amount for lowering the electrical resistance of said foam of tetracyanoethylene in a suitable solvent under foam forming conditions; and
reticulating said foam to a void volume of more than 80%.

25. A thermosetting plastic foam composition having a volume resistivity of $10^{12}$ ohm cm or less comprising the product obtained by reacting a polyol reactant selected from the group consisting of polyester polyols, polyether polyols, mixtures of polyether and polyester polyols and mixtures of polyether polyols and copolymer polyols with an isocyanate reactant in the presence of tetracyanoethylene.

26. A foam composition according to claim 25, wherein said product is reticulated and has a void volume of at least 80%.

27. The foam composition of claim 25 wherein said foam is non-reticulated open cell foam.

28. The foam composition of claim 26 wherein said polyol is a polyether polyol.

29. The foam composition of claim 26 wherein said polyol is a mixture of a polyether polyol and a copolymer polyol.

30. The foam composition of claim 26 wherein said foam has a void volume of more than 90%.

* * * * *